(12) United States Patent
Arinaga et al.

(10) Patent No.: US 8,222,758 B2
(45) Date of Patent: Jul. 17, 2012

(54) WIND TURBINE GENERATOR

(75) Inventors: Shinji Arinaga, Nagasaki (JP);
Takatoshi Matsushita, Nagasaki (JP);
Tsuyoshi Wakasa, Nagasaki (JP);
Masaaki Shibata, Nagasaki (JP); Akira Yasugi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 167 days.

(21) Appl. No.: 12/674,550

(22) PCT Filed: Dec. 14, 2007

(86) PCT No.: PCT/JP2007/074120
§ 371 (c)(1),
(2), (4) Date: Mar. 28, 2010

(87) PCT Pub. No.: WO2009/078075
PCT Pub. Date: Jun. 25, 2009

(65) Prior Publication Data
US 2010/0213712 A1    Aug. 26, 2010

(51) Int. Cl.
*F03D 9/00* (2006.01)
*H02P 9/04* (2006.01)

(52) U.S. Cl. ........................................................ 290/44

(58) Field of Classification Search .................. 290/44, 290/55; 415/1; 307/11, 43; 322/44; 416/1
See application file for complete search history.

(56) References Cited

U.S. PATENT DOCUMENTS

| | | | |
|---|---|---|---|
| 4,914,373 A * | 4/1990 | Rivkine | 322/1 |
| 6,921,985 B2 | 7/2005 | Janssen et al. | |
| 7,035,210 B2 | 4/2006 | Walles | |
| 7,095,130 B2 * | 8/2006 | Ichinose et al. | 290/44 |
| 7,355,296 B2 * | 4/2008 | Ichinose et al. | 290/44 |
| 7,423,412 B2 | 9/2008 | Weng et al. | |
| 7,485,980 B2 * | 2/2009 | Ichinose et al. | 290/44 |
| 7,709,972 B2 * | 5/2010 | Arinaga et al. | 290/55 |
| 2001/0050855 A1 * | 12/2001 | Aiello et al. | 363/50 |
| 2005/0122654 A1 | 6/2005 | Culligan et al. | |

(Continued)

FOREIGN PATENT DOCUMENTS

| | | |
|---|---|---|
| DE | 10206828 A1 | 8/2003 |
| EP | 1276201 A2 | 1/2003 |
| EP | 1276281 A2 | 1/2003 |
| JP | 1146733 U | 10/1989 |
| JP | 08-130883 | 5/1996 |
| JP | 2003-018740 | 1/2003 |

(Continued)

OTHER PUBLICATIONS

ISR for PCT/JP2007/074120 mailed Feb. 26, 2008.
EP Search Report for 07850624.3 mailed Dec. 16, 2011.

*Primary Examiner* — Julio Gonzalez
(74) *Attorney, Agent, or Firm* — Kanesaka Berner & Partners LLP

(57) ABSTRACT

An object is to improve the operating rate. A first switch is provided in a power line connecting a power generator to a power system, and a second switch that can be opened and closed by remote control is provided in the power line between the power generator and the first switch. In the second switch, a withstand current capability is set that allows current flowing in a low-voltage event and that withstands current having a value equal to or less than a current value specified by the thermal setting of the power generator. In the first switch, a withstand current capability is set that is superior to the withstand current capability of the second switch and that withstands current having a value equal to or less than the current value specified by the thermal setting of the power generator.

6 Claims, 8 Drawing Sheets

U.S. PATENT DOCUMENTS

| | | | |
|---|---|---|---|
| 2005/0151377 A1* | 7/2005 | Ichinose et al. | 290/44 |
| 2007/0216165 A1* | 9/2007 | Oohara et al. | 290/44 |
| 2008/0054641 A1* | 3/2008 | Voss | 290/44 |
| 2009/0058086 A1* | 3/2009 | Arinaga et al. | 290/44 |
| 2009/0278351 A1* | 11/2009 | Rivas et al. | 290/44 |
| 2010/0237618 A1* | 9/2010 | Arinaga et al. | 290/44 |

FOREIGN PATENT DOCUMENTS

| | | |
|---|---|---|
| JP | 2003164186 A | 6/2003 |
| JP | 2007-239599 A | 9/2007 |
| WO | 01/28910 A1 | 4/2001 |
| WO | 2006060830 A1 | 6/2006 |
| WO | 2006127844 A2 | 11/2006 |

\* cited by examiner

といった,

WIND TURBINE GENERATOR

RELATED APPLICATIONS

The present application is national phase of, and claims priority from, International Application Number PCT/JP2007/074120 filed Dec. 14, 2007, the disclosure of which is hereby incorporated by reference herein in its entirety.

TECHNICAL FIELD

The present invention relates to wind turbine generator.

BACKGROUND ART

In wind-turbine operation control, an operation is employed in which, if the system voltage is reduced due to the occurrence of a power failure or the like, the connection between a wind turbine and a power system is immediately disconnected to avoid damage to a power generator etc. caused by overcurrent. On the other hand, for example, if a low-voltage event such as that shown in a voltage reduction pattern etc. required by LVRT (low voltage ride-through) occurs, the connection between the wind turbine and the power system needs to be maintained to continuously operate the wind turbine.

Patent Citation 1:
U.S. Pat. No. 6,921,985

DISCLOSURE OF INVENTION

When a voltage drop larger than that in the above-mentioned low-voltage event occurs, there is a possibility of the power generator current becoming excessive, and a circuit breaker that is disposed in the power system and that connects the power generator and the power system becoming tripped before a reduction in the system voltage is detected.

If the circuit breaker is tripped, a worker needs to travel to the wind turbine and manually close the circuit breaker for restarting. Therefore, there is a problem in that a considerable time is required for restarting, reducing the operating rate.

The present invention has been made to solve the above-described problem, and an object thereof is to provide a wind turbine generator that can improve the operating rate.

In order to solve the above-mentioned problem, the present invention employs the following solutions.

The present invention provides a wind turbine generator including: a power generator; a first switch that is provided in a power line connecting the power generator to a power system; and a second switch that is provided in the power line between the power generator and the first switch and that can be opened and closed by remote control, in which the second switch has a withstand current capability that allows current flowing in a low-voltage event and that withstands current having a value equal to or less than a current value specified by thermal setting of the power generator, and in which the first switch has a withstand current capability that is superior to the withstand current capability of the second switch and that withstands current having a value equal to or less than the current value specified by the thermal setting of the power generator.

As described above, the second switch and the first switch have withstand current capabilities that can withstand the occurrence of overcurrent caused by a voltage drop due to a low-voltage event. Therefore, they are not tripped even when a low-voltage event occurs, thus making it possible to maintain the connection state of the power generator and the power system. When current larger than the overcurrent flowing at the low-voltage event flows, the second switch is tripped prior to the first switch, so that tripping of the first switch can be avoided. The second switch can be opened and closed by remote control, it is easily turned on even after tripping thereof.

The superiority of the withstand current capability of the first switch over the withstand current capability of the second switch means that the allowable current value of the first switch is set larger than the allowable current value of the second switch, for example.

In the above-described wind turbine generator, the second switch may be used to connect the power generator to the power system when a startup condition is satisfied.

In the above-described wind turbine generator, the low-voltage event is an event in which a voltage becomes 0 V for a period of one hundred milliseconds or more and less than several hundred milliseconds, and recovery from a voltage drop requires several seconds.

For example, the low-voltage event shows a voltage reduction pattern required by LVRT.

According to the present invention, an advantage is afforded in that the operating rate can be improved.

EXPLANATION OF REFERENCE:

1: wind turbine generator
5: power generator
30: circuit breaker
40: magnet contactor

Best Mode for Carrying Out the Invention

A wind turbine generator according to one embodiment of the present invention will be described below with reference to the drawings.

Figure 1:
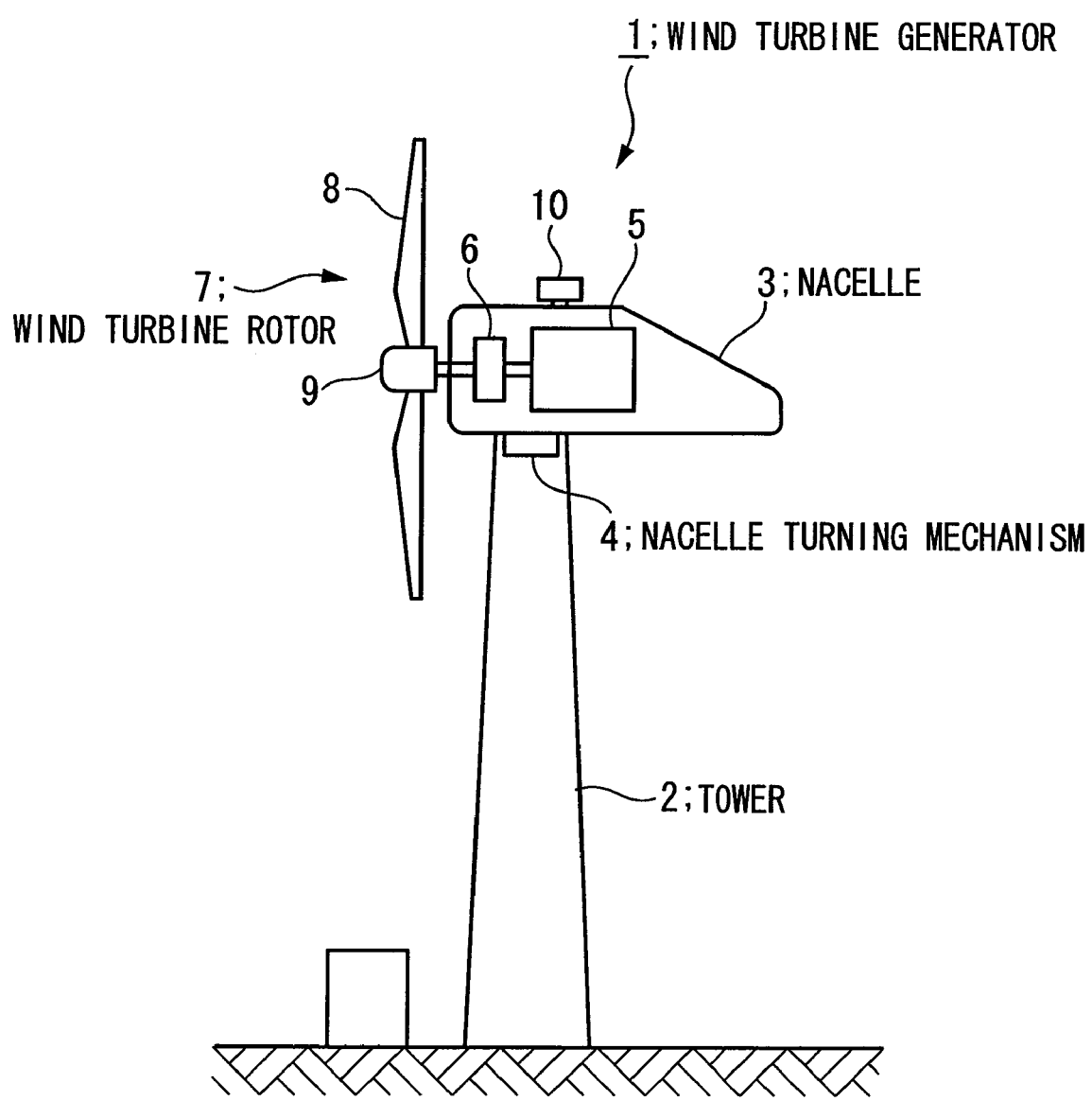
FIG. 1 is a view showing the overall configuration of a wind turbine generator according to one embodiment of the present invention.

FIG. 1 is a block diagram showing the overall configuration of the wind turbine generator according to this embodiment. As shown in FIG. 1, the wind turbine generator 1 includes a tower 2 and a nacelle 3 provided at an upper end of the tower 2. The nacelle 3 can turn in a yawing direction and is directed in a desired direction by a nacelle turning mechanism 4. The nacelle 3 includes a power generator 5 and a gear 6. A rotor of the power generator 5 is joined to a wind turbine rotor 7 via the gear 6.

Figure 2:
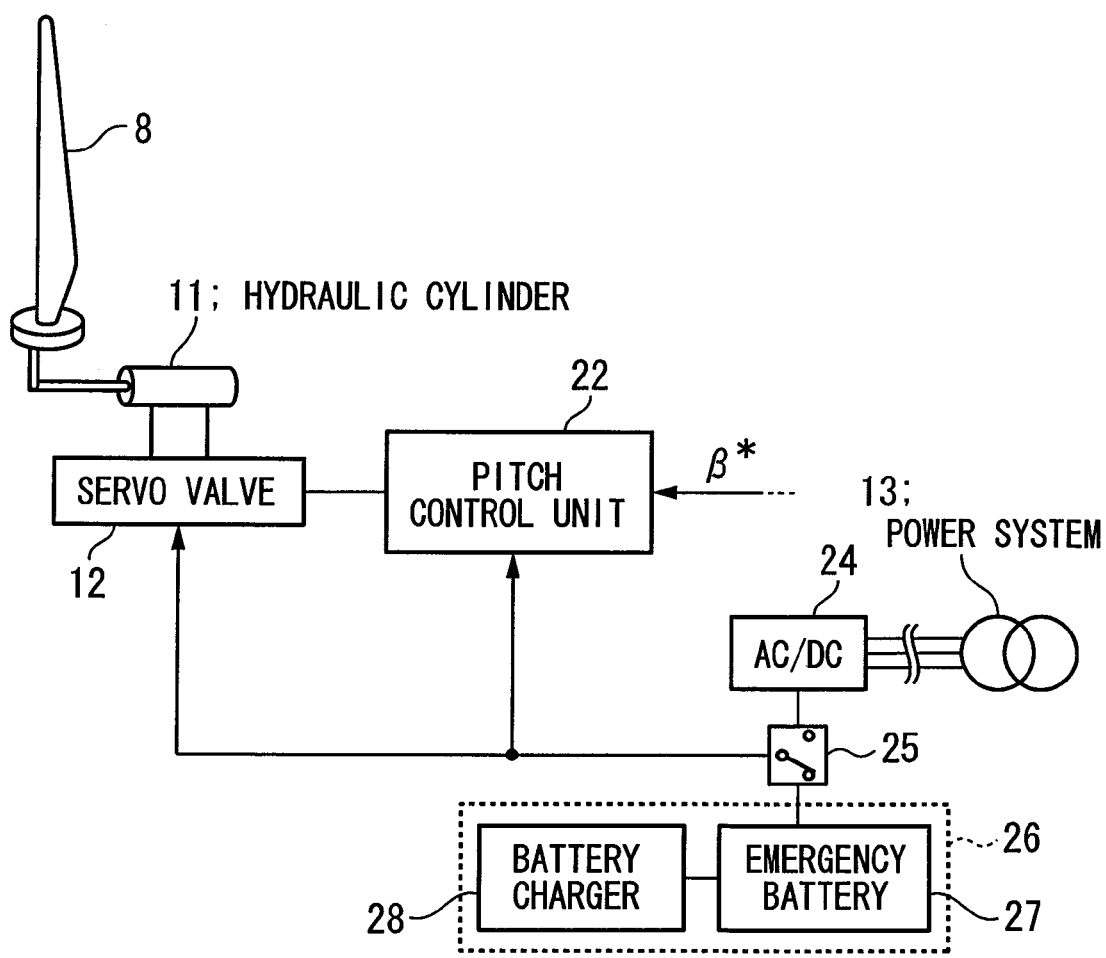
FIG. 2 is a diagram more specifically showing the configuration of the wind turbine generator shown in FIG. 1.

The wind turbine rotor 7 includes blades 8 and a hub 9 that supports the blades 8. The blades 8 are provided such that their pitch angle is variable. Specifically, as shown in FIG. 2, the hub 9 accommodates a hydraulic cylinder 11 that drives the blades 8 and a servo valve 12 that supplies hydraulic pressure to the hydraulic cylinder 11. The hydraulic pressure supplied to the hydraulic cylinder 11 is controlled by the degree of opening of the servo valve 12, and thus the blades 8 are controlled to have a desired pitch angle.

Referring back to FIG. 1, the nacelle 3 further includes an anemovane 10. The anemovane 10 measures the wind speed and the wind direction. The nacelle 3 is turned in accordance with the wind speed and the wind direction measured by the anemovane 10.

Figure 3:
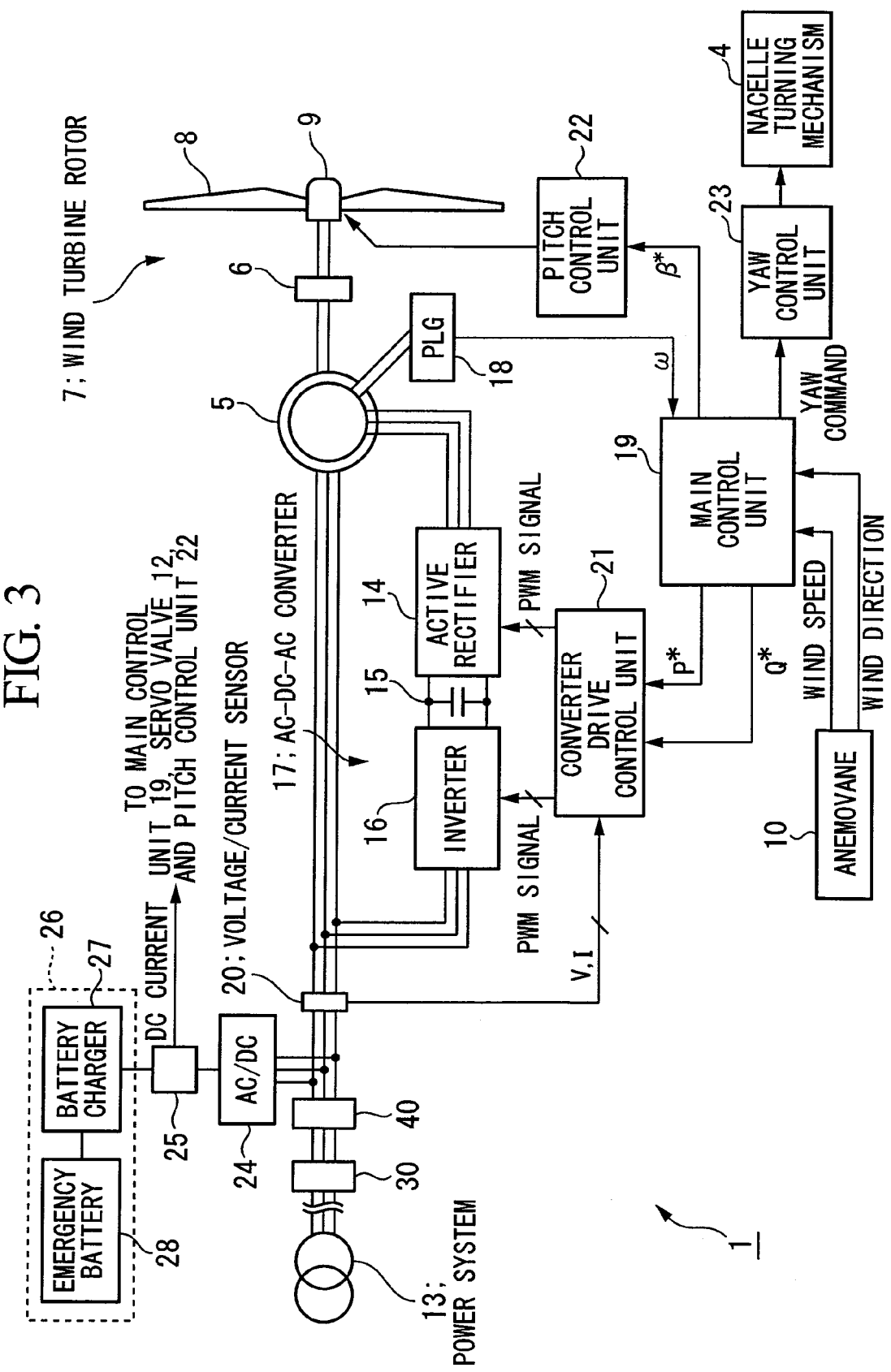
FIG. 3 is a block diagram showing an example configuration of a power generator and its surroundings.

FIG. 3 is a block diagram showing an example configuration of the power generator 5 and its surroundings. The power generator 5 of this embodiment is configured such that electric power generated by the power generator 5 can be output to a power system 13 from both a stator winding and a rotor winding. Specifically, the stator winding of the power generator 5 is directly connected to the power system 13, and the rotor winding thereof is connected to the power system 13 via an AC-DC-AC converter 17.

The AC-DC-AC converter 17 includes an active rectifier 14, a DC bus 15, and an inverter 16 and converts alternating-current power received from the rotor winding into alternating-current power suitable for the frequency of the power system 13. The active rectifier 14 converts alternating-current power generated by the rotor winding into direct-current power and outputs the direct-current power to the DC bus 15. The inverter 16 converts the direct-current power received through the DC bus 15 into alternating-current power having the same frequency as that of the power system 13 and outputs the alternating-current power.

The AC-DC-AC converter 17 also has a function of converting alternating-current power received from the power system 13 into alternating-current power suitable for the frequency of the rotor winding, and is also used to excite the rotor winding depending on the operation conditions of the wind turbine generator 1. In this case, the inverter 16 converts alternating-current power into direct-current power and outputs the direct-current power to the DC bus 15. The active rectifier 14 converts the direct-current power received through the DC bus 15 into alternating-current power suitable for the frequency of the rotor winding and supplies the alternating-current power to the rotor winding of the power generator 5.

A voltage/current sensor 20 is provided in a power line connecting the power generator 5 to the power system 13 and measures an output voltage V and an output current I of the power generator 5.

A converter drive control unit 21 controls the on/off state of power transistors of the active rectifier 14 and the inverter 16 in order to control active power P and reactive power Q output in response to an active power command P* and a reactive power command Q*. Specifically, the converter drive control unit 21 calculates the active power P and the reactive power Q from the output voltage V and the output current I measured by the voltage/current sensor 20. Furthermore, the converter drive control unit 21 performs PWM control in response to the difference between the active power P and the power specified by the active power command P* and the difference between the reactive power Q and the power specified by the reactive power command Q* to generate a PWM signal, and supplies the generated PWM signal to the active rectifier 14 and the inverter 16. In this way, the active power P and the reactive power Q are controlled.

A pitch control unit 22 controls a pitch angle β of the blades 8 in response to a pitch command β* sent from a main control unit 19. The pitch angle β of the blades 8 is controlled so as to match the pitch command β*.

A yaw control unit 23 controls the nacelle turning mechanism 4 in response to a yaw command sent from the main control unit 19. The nacelle 3 is directed in a direction instructed by the yaw command.

An AC/DC converter 24 is connected to the power line at a downstream side of the above-described voltage/current sensor. The AC/DC converter 24 generates direct-current power from alternating-current power received from the power system 13 through the power line and supplies the direct-current power to a control system of the wind turbine generator 1, in particular, to the servo valve 12 (see FIG. 2) used to control the pitch angle β of the blades 8, the main control unit 19, and the pitch control unit 22.

In order to stably supply the direct-current power to the servo valve 12 (see FIG. 2), the main control unit 19, and the pitch control unit 22, the wind turbine generator 1 is provided with an uninterruptible power system 26 that includes a battery charger 27 and an emergency battery 28.

For example, even if a system voltage Vgrid is reduced due to the requirement of LVRT, a state where the power generator 5 is connected to the power system 13 needs to be maintained. For this purpose, even if the voltage of the power system 13 is reduced, it is necessary to properly control the pitch angle of the blades 8, thus maintaining a desired number of rotations of the power generator 5. To satisfy such a demand, when the system voltage Vgrid is reduced to a predetermined voltage, the uninterruptible power system 26 is connected by a switch 25 to the servo valve 12, the main control unit 19, and the pitch control unit 22, and power is supplied from the emergency battery 28 to the servo valve 12, the main control unit 19, and the pitch control unit 22. Thus, the control of the pitch angle of the blades 8 is maintained. The emergency battery 28 is connected to the battery charger 27. The battery charger 27 charges the emergency battery 28 by direct-current power supplied from the AC/DC converter 24.

A circuit breaker (first switch) 30 is provided in the power line that connects the power generator 5 to the power system 13. Specifically, the circuit breaker 30 is provided at a position closest to the power system 13 among all components included in the wind turbine.

A magnet contactor (second switch) 40 is provided in the power line between the power generator 5 and the circuit breaker 30. Specifically, the magnet contactor 40 is provided at a location closest to the power system 13, except for the circuit breaker 30 among all the components included in the wind turbine.

The circuit breaker 30 and the magnet contactor 40 are disposed in an interconnection board (not shown) disposed at a lower portion of the tower 2.

The magnet contactor 40 is a switch used to connect the power generator 5 to the power system 13 when the output of the power generator 5 satisfies a startup condition, and can be opened and closed by remote control.

The circuit breaker 30 is a relay provided to avoid damage to the power generator 5 etc. caused by overcurrent, and cannot be remotely controlled. Therefore, once it is tripped, a worker needs to manually close it directly.

Next, the withstand current capabilities of the circuit breaker 30 and the magnet contactor 40, which are features of the present invention, will be described with reference to the drawings.

The magnet contactor 40 has a withstand current capability that allows current flowing in a low-voltage event and that withstands current having a value equal to or less than a current value specified by the thermal setting of the power generator 5. The circuit breaker 30 has a withstand current capability that is superior to the withstand current capability of the magnet contactor 40 and that withstands current having a value equal to or less than the current value specified by the thermal setting of the power generator 5.

In a low-voltage event, the voltage becomes 0 V for a period of one hundred milliseconds or more and less than several hundred milliseconds, and recovery from the voltage drop requires several seconds, for example. Examples of this low-voltage event include, for example, the voltage reduction pattern required by LVRT.

Figure 4:
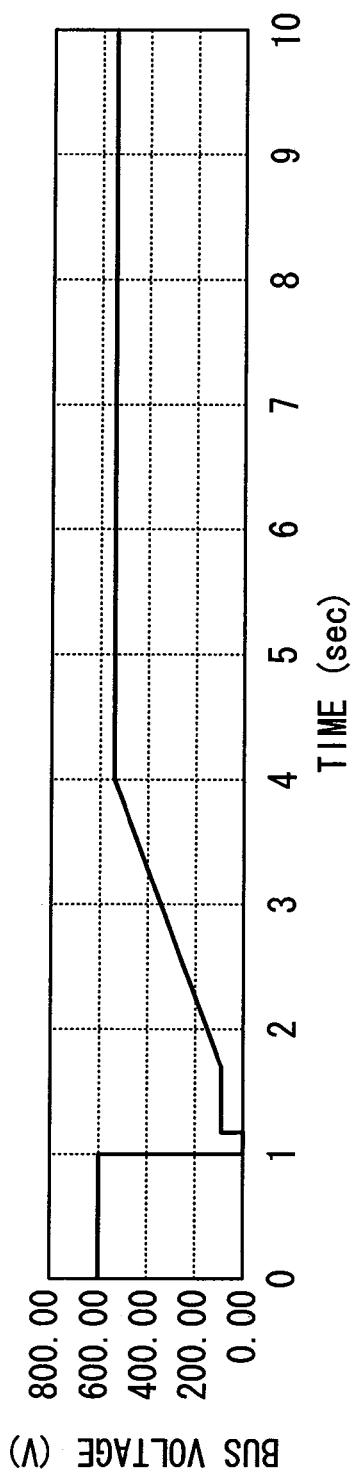
FIG. 4 is a diagram showing an example voltage reduction pattern required by LVRT.

FIG. 4 shows an example of the voltage reduction pattern required by LVRT. In the voltage reduction pattern shown in FIG. 4, the system voltage Vgrid first instantaneously drops to 0 V, this state is maintained for 150 ms, the voltage then gradually recovers, and the system voltage Vgrid recovers after approximately 4 seconds from the instantaneous voltage drop. A simulation analysis was carried out to find out how the output voltage V and the output current I of the power generator 5 change when the system voltage Vgrid changes as described above.

Figure 5:
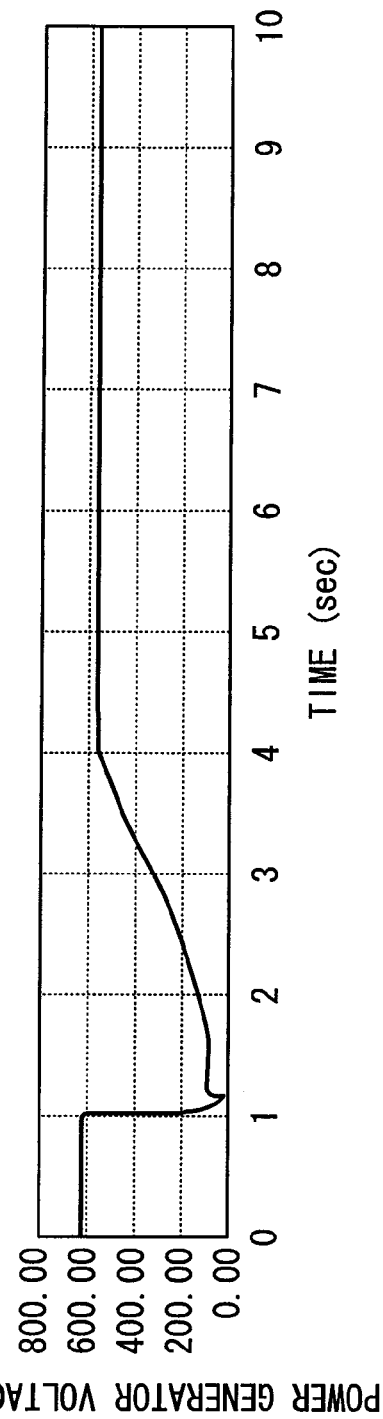
FIG. 5 is a diagram showing an analysis result obtained when the output voltage of the power generator at the time of occurrence of the voltage reduction pattern shown in FIG. 4 is analyzed in simulation.
Figure 6:
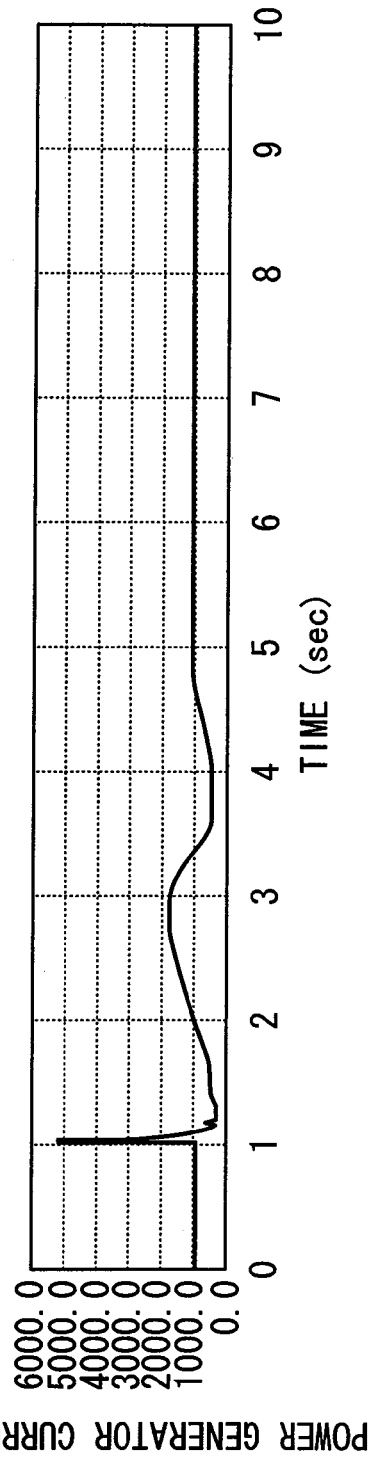
FIG. 6 is a diagram showing an analysis result obtained when the output current of the power generator at the time of occurrence of the voltage reduction pattern shown in FIG. 4 is analyzed in simulation.

Results thereof are shown in FIGS. 5 and 6. FIG. 5 shows a change in the output voltage V of the power generator 5, and FIG. 6 shows a change in the output current I of the power generator 5. The output voltage V of the power generator 5 shown in FIG. 5 indicates approximately the same change as the system voltage Vgrid shown in FIG. 4. The output current I of the power generator 5 shown in FIG. 6 instantaneously becomes overcurrent when the system voltage Vgrid instantaneously drops, then fluctuates around the rated current, and stabilizes when approximately several hundred milliseconds elapse after the system voltage Vgrid recovers.

Figure 7:
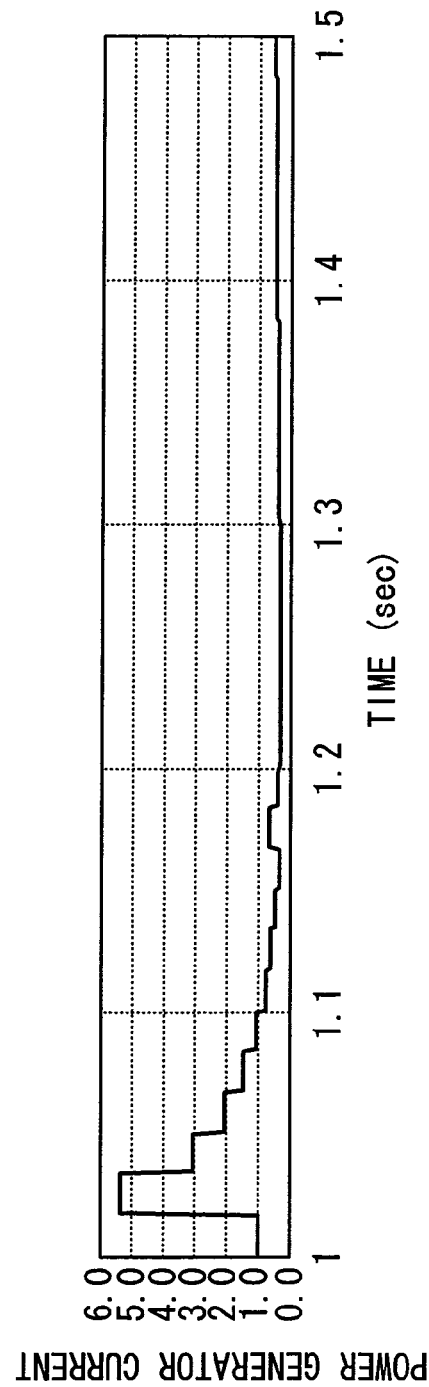
FIG. 7 is a diagram showing the ratio of the output current of the power generator shown in FIG. 6 with respect to the rated current, with the time axis being expanded.

FIG. 7 shows the ratio of the output current I of the power generator 5 shown in FIG. 6 with respect to the rated current, with the time axis (horizontal axis) being expanded. FIG. 7 shows the current value in a stepwise fashion because the effective value of the output current I of the power generator 5 is calculated every 1/60 seconds. As shown in FIG. 7, it is understood that up to approximately 5.5 times the current flows for 1/60 seconds when a low-voltage event having the voltage reduction pattern shown in FIG. 4 occurs.

Therefore, in order to cope with the voltage reduction pattern shown in FIG. 4, the magnet contactor 40 needs to have a withstand current capability that does not cause tripping even when overcurrent at least 5.5 times the rating flows.

The voltage reduction pattern for a low-voltage event shown in FIG. 4 is merely one example, and the magnet contactor 40 needs to have a withstand voltage capability that overcomes all voltage reduction patterns required by LVRT, for example.

Figure 8:
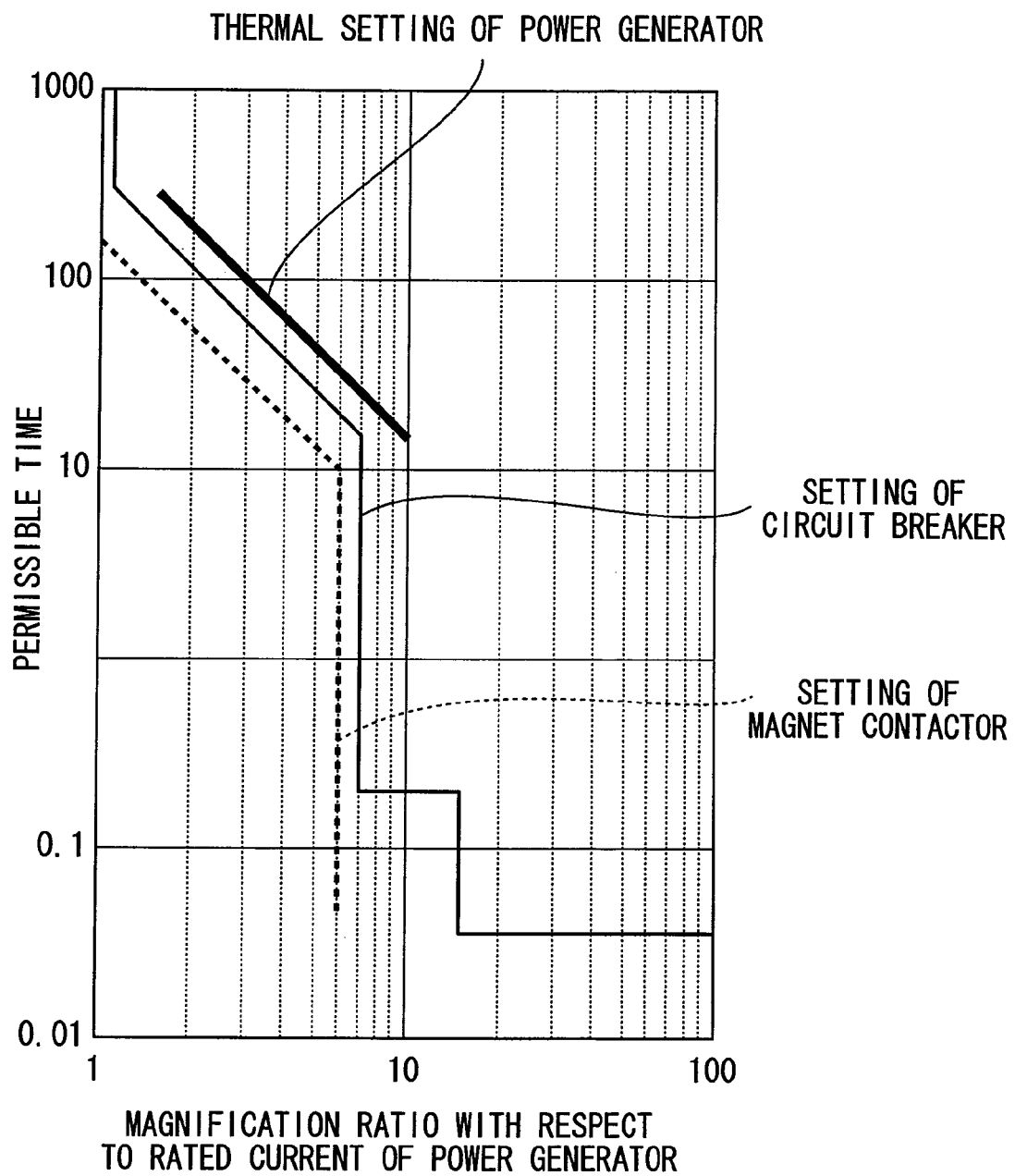
FIG. 8 is a diagram showing an example thermal-setting relationship among a magnet contactor, a circuit breaker, and the power generator according to the embodiment of the present invention.

Next, FIG. 8 shows an example thermal-setting relationship among the magnet contactor, the circuit breaker, and the power generator. In FIG. 8, the horizontal axis indicates the magnification ratio with respect to the rated current of the power generator 5, and the vertical axis indicates a permissible time.

As shown in FIG. 8, the maximum allowable current of the magnet contactor 40 is set lower than that of the circuit breaker 30, and the maximum allowable currents of the circuit breaker 30 and the magnet contactor 40 are set within their thermal-setting ranges.

As described above, according to the wind turbine generator 1 of this embodiment, since the magnet contactor 40 and the circuit breaker 30 have withstand current capabilities that can withstand the occurrence of overcurrent caused by a voltage drop due to a low-voltage event, they are not tripped even when a low-voltage event occurs, thus making it possible to maintain the connection state of the power generator 5 and the power system 13.

When current larger than the overcurrent flowing at the occurrence of a low-voltage event flows, the magnet contactor 40 is tripped prior to the circuit breaker 30, so that tripping of the circuit breaker 30 can be avoided. Here, since the magnet contactor 40 can be opened and closed by remote control, it is easily turned on even after tripping thereof. Therefore, even when current larger than the overcurrent flowing at the occurrence of a low-voltage event flows, it is possible to start the wind turbine generator 1 merely by remotely closing the magnet contactor 40 again. In other words, to restart the wind turbine generator 1, it is possible to save a worker the trouble of traveling to the wind turbine and manually closing the circuit breaker 30. Therefore, it is possible to immediately set the wind turbine generator 1 ready for restarting and to improve the operating rate.

The embodiment of the present invention has been described above in detail with reference to the drawings; however, the specific configurations are not limited to this embodiment, and design changes etc. are also included without departing from the scope of the present invention.

The invention claimed is:

1. A wind turbine generator comprising:
   a power generator;
   a first switch that is provided in a power line connecting the power generator to a power system; and
   a second switch that is provided in the power line between the power generator and the first switch and that can be opened and closed by remote control,
wherein
   the second switch has a withstand current capability that
      allows current to flow in a low-voltage event and
      allows the second switch to withstand current having a value equal to or less than a current value specified by thermal setting of the power generator, and
   the first switch has a withstand current capability that
      is higher to the withstand current capability of the second switch and
      allows the first switch to withstand current having a value equal to or less than the current value specified by the thermal setting of the power generator.

2. The wind turbine generator according to claim 1, wherein the second switch is configured to connect the power generator to the power system when a startup condition is satisfied.

3. The wind turbine generator according to claim 1, wherein the low-voltage event is an event in which a voltage becomes 0 V for a period of one hundred milliseconds or more and less than several hundred milliseconds, and recovery from a voltage drop requires several seconds.

4. The wind turbine generator according to claim 1, wherein the low-voltage event shows a voltage reduction pattern required by low voltage ride-through.

5. The wind turbine generator according to claim 1, wherein a maximum allowable current of the second switch is lower than a maximum allowable current of the first switch.

6. The wind turbine generator according to claim 1, further comprising a voltage/current sensor that is provided in the power line connecting the power generator to a power system and measures an output voltage and an output current of the power generator.

* * * * *